United States Patent
Janajreh et al.

(10) Patent No.: US 6,868,878 B2
(45) Date of Patent: Mar. 22, 2005

(54) PNEUMATIC TIRE INCLUDING BELT CUSHION SECTION AND HAVING CONDUCTIVE PATH BETWEEN BELT LAYER AND CARCASS AND METHOD OF MAKING SAME

(75) Inventors: Ibrahim Janajreh, Greenville, SC (US); Glenn Gordon, Greer, SC (US); Pierre Andreani, Simpsonville, SC (US)

(73) Assignee: Michelin Recherche et Technique S.A. (CH)

(*) Notice: Subject to any disclaimer, the term of this patent is extended or adjusted under 35 U.S.C. 154(b) by 190 days.

(21) Appl. No.: 10/271,331

(22) Filed: Oct. 14, 2002

(65) Prior Publication Data

US 2004/0069386 A1 Apr. 15, 2004

(51) Int. Cl.$^7$ ............... B29D 30/06; B60C 1/00; B60C 19/08; B60C 11/00
(52) U.S. Cl. ............... 152/152.1; 152/209.5; 152/532; 152/DIG. 2; 156/123; 156/128.1
(58) Field of Search ............... 152/152.1, 209.5, 152/532, DIG. 2; 156/123, 128.1, 128.6, 129, 130.5

(56) References Cited

U.S. PATENT DOCUMENTS

| | | | | |
|---|---|---|---|---|
| 2,329,332 A | * | 9/1943 | Bull et al. | 152/152.1 |
| 2,342,576 A | * | 2/1944 | Fielding | 152/152.1 |
| 5,397,616 A | | 3/1995 | Aoki | |
| 5,937,926 A | | 8/1999 | Powell | |
| 5,942,069 A | | 8/1999 | Gerresheim et al. | |
| 6,220,319 B1 | | 4/2001 | Reuter | |
| 6,269,854 B1 | | 8/2001 | Matsuo et al. | |
| 6,289,958 B1 | | 9/2001 | Dheur et al. | |
| 6,294,119 B1 | * | 9/2001 | Nakamura | 264/173.12 |
| 6,367,525 B1 | | 4/2002 | Hiruma et al. | |

FOREIGN PATENT DOCUMENTS

| | | | |
|---|---|---|---|
| EP | 0798142 | | 10/1997 |
| GB | 544757 | * | 4/1942 |
| JP | 3-7602 | * | 1/1991 |
| JP | 1120409 | | 1/1999 |
| JP | 1120426 | | 1/1999 |
| JP | 11034611 | | 2/1999 |
| JP | 11034612 | | 2/1999 |
| JP | 11048711 | | 2/1999 |
| JP | 11115414 | | 4/1999 |
| JP | 11227415 | | 8/1999 |
| WO | 9838050 | | 9/1998 |
| WO | 9943505 | | 9/1999 |

OTHER PUBLICATIONS

Partial translation for WO 98/38050*
Measurement procedure for the electrical discharge resistance of pneumatic tires under pressure Employers' Association of German Rubber Industries e. V.; Feb. 1997.

* cited by examiner

Primary Examiner—Steven D. Maki
(74) Attorney, Agent, or Firm—Dority & Manning, P.A.

(57) ABSTRACT

A pneumatic tire constructed with an electrically conductive tire tread that defines a channel extending radially inward through a tread base rubber having a relatively high electrical resistivity so as to provide a conductivity path to a belt layer within the tire. In certain embodiments, a conductivity path extending from the belt layer through a belt cushion section to a carcass section of the tire is also provided.

11 Claims, 7 Drawing Sheets

PNEUMATIC TIRE INCLUDING BELT CUSHION SECTION AND HAVING CONDUCTIVE PATH BETWEEN BELT LAYER AND CARCASS AND METHOD OF MAKING SAME

FIELD OF THE INVENTION

The present invention relates to a pneumatic tire constructed with an electrically conductive tire tread that defines a channel extending radially inward through a tread base rubber having a relatively high electrical resistivity so as to provide a conductivity path to a belt layer within the tire. In certain embodiments, the present invention also provides for a conductivity path extending from the belt layer through a belt cushion section to a carcass within the tire.

BACKGROUND OF THE INVENTION

Unless a grounding path is provided, moving vehicles experience a build-up of static electricity that can be of relatively high voltage. Such charge build-up is undesirable for a number of reasons. For example, the presence of such a charge can have an adverse effect on the vehicle's electronic circuitry including radio reception. A charge can create a spark potential that can present a safety hazard during refueling. The grounding of a charge through a vehicle occupant, typically upon entering or exiting the vehicle, can be particularly uncomfortable.

The tendency of a charge to build on a vehicle can be dissipated by providing a continuous ground to earth. Previously, particularly for larger vehicles, a ground was provided by dragging along a chain or other electrical conductor connected to the frame of the vehicle. As the vehicle moved, a charge was conducted to the ground along the chain.

Tires can also be used to provide a ground that dissipates an electrical charge. However, not all materials that might be used in tire construction are necessarily electrically conductive. Rubber compositions that are electrically conductive are generally constructed from compounds having significant proportions of conductive carbon black. Conversely, rubber compositions that are relatively nonconductive tend to have significantly larger amounts of silica relative to carbon black. In general, increasing the relative proportion of silica relative to carbon black decreases conductivity. However, the size and type of the carbon black particulates and the amount of carbon black loading also affects the level of conductivity.

While silica based compositions are generally poor conductors of electricity, the use of silica as a reinforcing material in the tread can provide increased braking ability under wet conditions and also can result in a tire having decreased rolling resistance. Accordingly, methods of providing a path of electrical conductivity through an electrically insulating tread have been suggested. For example, see U.S. Pat. Nos. 6,220,319 or 6,367,525. However, these constructions are not acceptable where a manufacturer desires to use a tread constructed from a material that is electrically conducting. Furthermore, if a manufacturer desires to use nonconducting compositions at other layers of the tire other than the tread, the tire may not provide a ground regardless of a conducting tread.

BRIEF SUMMARY OF THE INVENTION

Objects and advantages of the invention will be set forth in part in the following description, or may be obvious from the description, or may be learned through practice of the invention.

In one exemplary embodiment of a pneumatic tire according to the present invention, a tread section is provided that is constructed from an electrically conductive material. Such tire includes a pair of nonconductive sidewall portions, a pair of bead bundles, and a carcass section that extends between the pair of bead bundles and is wrapped around each bead bundle. A belt cushion section is disposed radially outside the carcass section and is constructed from an electrically insulating material. At least one belt layer is disposed radially outside of the belt cushion section but radially inward from the tread section.

The belt cushion section includes a series of electrically conductive segments that are spaced in a direction extending circumferentially around the tire. These segments extend radially inward so as to provide an electrically conductive path between the belt layer and the carcass section.

The tread section may be constructed from materials having a discharge resistance of about $10^{10}$ ohms or less. The series of electrically conductive segments may also be constructed from the same material as used for the belt layer, may be constructed from the same material as used for the carcass section, or both. For this exemplary embodiment, the tread section may be constructed from a conducting tread cap rubber and a nonconducting tread base rubber, with the tread base rubber being located radially inside the tread cap rubber. In such case, the tread cap rubber defines a conducting bridge extending radially inward from the tread cap rubber, through the tread base rubber, and provides an electrically conductive path to the belt layer. The tread cap rubber may be constructed to include a series of tread peaks and grooves with the conducting bridge extending radially inward from the tread groove.

In another exemplary embodiment, a pneumatic tire is provided having a tread cap rubber defining the tread of the tire and is constructed from an electrically conductive rubber material. A tread base rubber is disposed radially inside the tread cap rubber. The tread base rubber is constructed from an electrically insulating rubber. In this example, the pneumatic tire includes a pair of nonconductive sidewall portions, a pair of bead bundles, and a carcass extending between the pair of bead bundles. The carcass is wrapped around each bead bundle. A belt cushion section is disposed radially outside the carcass and is constructed from outer insulating portions separated circumferentially by an inner conducting portion. At least one belt layer is disposed radially outside of the belt cushion section but radially inward from the tread base rubber. The tread cap rubber also defines a conducting bridge extending radially inward from the tread cap rubber, through the tread base rubber, and provides an electrically conductive path to the belt layer.

In another exemplary embodiment, a pneumatic tire is provided having a tread cap rubber that defines the tread of the tire. The tread cap rubber is constructed from an electrically conductive rubber material. A tread base rubber is disposed radially inside the tread cap rubber and is constructed from an electrically insulating rubber. Such tire includes a pair of nonconductive sidewall portions, a pair of bead bundles, and a carcass section extending between the pair of bead bundles and being wrapped around each bead bundle. A belt cushion section is disposed radially outside the carcass section. At least one belt layer is disposed radially outside of the belt cushion section but radially inward from the tread base rubber. The tread cap rubber also defines a first conducting path extending radially inward from the tread cap rubber, through the tread base rubber, so as to provide for the conduction of electricity between the tread cap rubber and the at least one belt layer.

In still another exemplary embodiment of the present invention, a method of manufacturing a pneumatic tire is provided. The steps of such method include providing a carcass section that extends between a pair of bead bundles. The carcass is wrapped around each bead bundle and is constructed from a first electrically conductive material. A belt cushion section is overlaid onto the carcass section; the belt cushion section is constructed from an electrically insulating material. A series of spaced apertures is formed circumferentially along the belt cushion section. At least one belt layer is provided and is disposed onto the belt cushion section at a position located radially outside of the belt cushion section. The at least one belt layer is constructed of a second electrically conductive material.

A tread section is extruded and includes a tread cap rubber defining the tread of the tire; the tread cap rubber being constructed from an electrically conductive rubber material. A tread base rubber is disposed radially inside the tread cap rubber. The tread cap rubber defines a first conducting path extending through the tread base rubber.

The tread section is applied onto the at least one belt layer to form an intermediate tire having the first conducting path electrically connected to the at least one belt layer. The intermediate tire is then subjected to heat and pressure so as to cause the first and second electrically conductive materials from the carcass section and the at least one belt layer respectively to migrate into the series of evenly spaced apertures and connect so as to provide a second conducting path between the carcass section and the at least one belt layer. Where desired, the first and second electrically conductive materials may be constructed so that the tire has a discharge resistance of about $10^{10}$ ohms or less. Alternatively, the first and second electrically conductive materials may be constructed so that the tire has a discharge resistance of about $10^6$ ohms or less if desirable.

These and other features, aspects and advantages of the present invention will become better understood with reference to the following description and appended claims. The accompanying drawings, which are incorporated in and constitute a part of this specification, are used to illustrate exemplary embodiments of the invention and, together with the description, serve to explain the principles of the invention. As will be apparent to one of ordinary skill in the art using the teachings disclosed herein, the present invention may be used in a variety of embodiments to provide a variety of different pneumatic tires.

DETAILED DESCRIPTION

Figure 1:
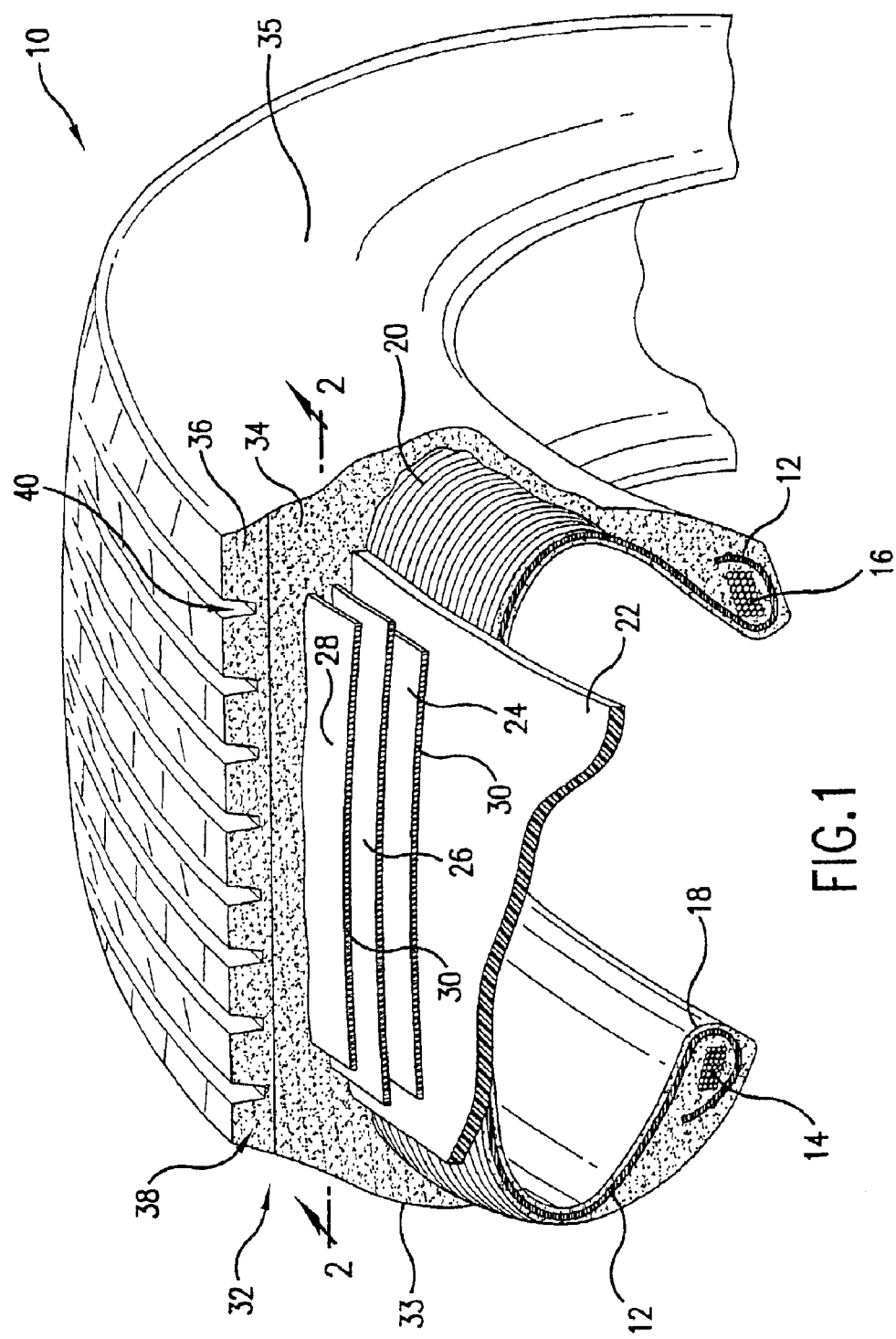
FIG. 1 is a partial cross-sectional view of a pneumatic tire.

Reference now will be made in detail to the embodiments of the invention, one or more examples of which are set forth in the drawings. Each example is provided by way of explanation of the invention and not meant as a limitation of the invention. For example, features illustrated or described as part of one embodiment may be used with another embodiment to yield still a further embodiment. In fact, it will be apparent to those skilled in the art that various modifications and variations can be made in the present invention without departing from the scope or spirit of the invention.

The present invention provides a pneumatic tire constructed with an electrically conductive tire tread that defines a channel extending radially inward through a tread base rubber having a relatively high electrical resistivity so as to provide a conductivity path to a belted layer within the tire. In certain embodiments, the present invention also provides for a conductivity path extending from the belted layer through a belt cushion layer to the carcass of the tire. Accordingly, the present invention allows for the discharge or dissipation of static electrical charges that can accumulate on an otherwise ungrounded moving vehicle.

Figure 2:
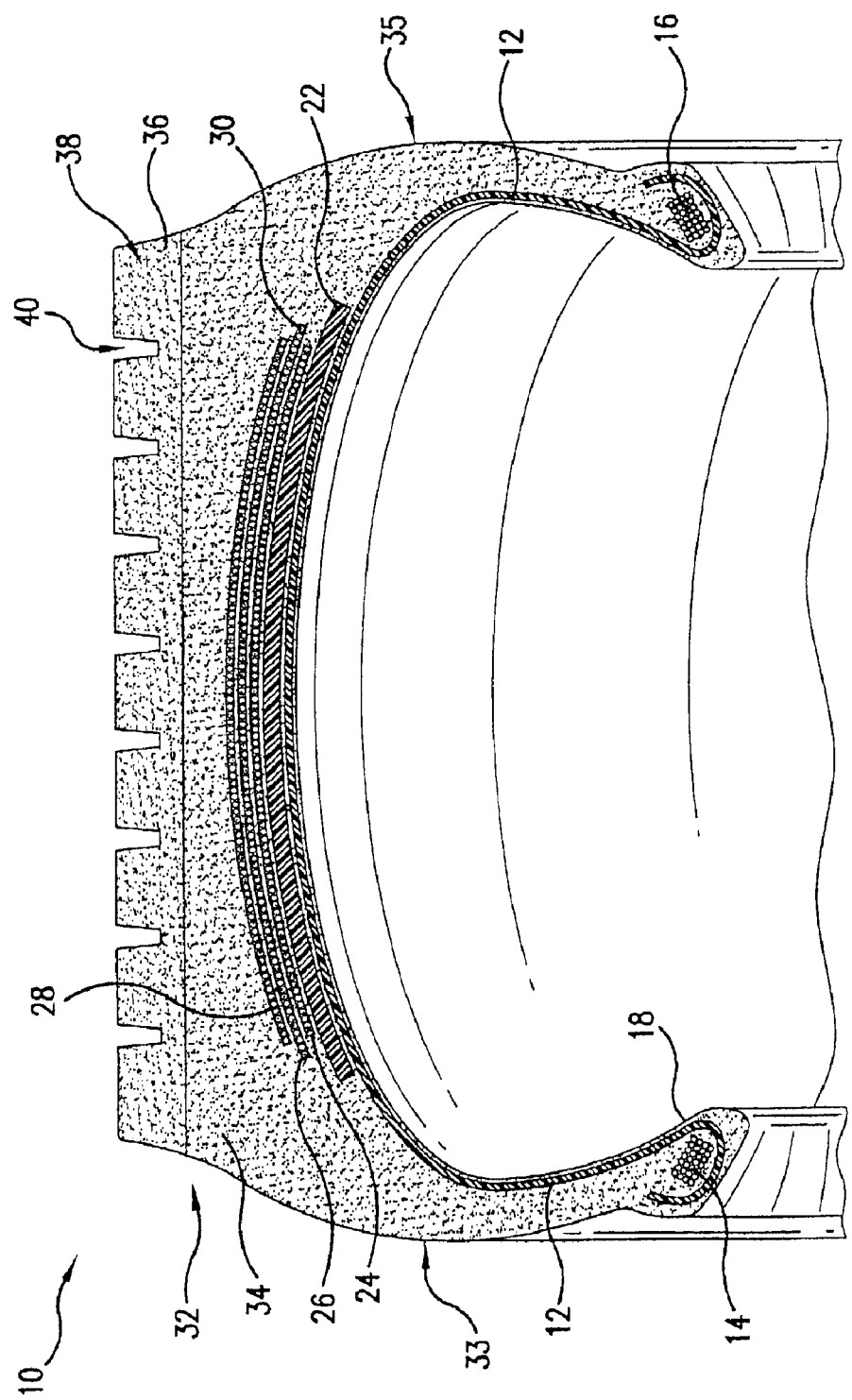
FIG. 2 is a cross-sectional view of the pneumatic tire of FIG. 1 taken along line 2—2.

As illustrated in FIG. 1 and FIG. 2, a pneumatic tire 10 includes a carcass 12 that wraps around beads 14 and 16 and extends across an air impermeable inner liner 18. As tire 10 is pressurized, carcass 12 retains the overall shape of tire 10 by containing the inner liner 18 and transferring force to beads 14 and 16. As the tire is inflated, beads 14 and 16 operate to secure tire 10 onto a wheel. Beads 14 and 16 are typically constructed from metals including various types of steel. Carcass 12 is strengthened by cords 20 that may be constructed from materials including various steels or organic materials such as nylon, rayon, polyester, and the like.

Belt cushion layer 22 is located radially outside carcass 12 and extends substantially over the width of carcass 12. Layer 22 provides a flat surface for the location of belt layers 24, 26, and 28. Three belt layers 24, 26, and 28 are depicted by way of example only; it should be understood that one or more belt layers may be used in the various embodiments of the present invention. Belt layers 24, 26, and 28 include steel cords 30 within a rubber based composition. Cords 30 of each layer 24, 26, and 28 may be arranged in different orientations with respect to each layer as will be understood by one of skill in the art.

Tread section 32 is located radially outside belt layers 24, 26, and 28 and spans between side wall portions 33 and 35. Tread section 32 includes a tread base rubber 34 and a tread cap rubber 36. For the purposes of illustration only, the relative height of tread section 32 has been somewhat enlarged with respect to the remaining parts of tire 10 in the figures. As shown in FIG. 1 and FIG. 2, tread section 32 defines a series of tread peaks 38 separated by tread grooves 40. The particular arrangement of peaks 38 and grooves 40 shown is by way of example only; numerous tread arrangements are possible and may be used with the present invention. It should be understood that as used herein, the term "tread peaks" refers to both tread lug sculptures as well as tread rib sculptures. Using the teachings disclosed herein, one of skill in the art will understand that the present invention may be used with a variety of different tread sculptures.

Belt cushion layer 22 is constructed from a composition that is nonconductive. In addition, tread base rubber 34 is also constructed from a nonconductive composition, while tread cap rubber 36 is constructed from a carbon black-based composition that is relatively conductive. Accordingly, to dissipate the build-up of a static electric charge on a vehicle equipped with tire 10, a conducting path from tread cap rubber 36 to conducting carcass 12 is desired.

Figure 3:
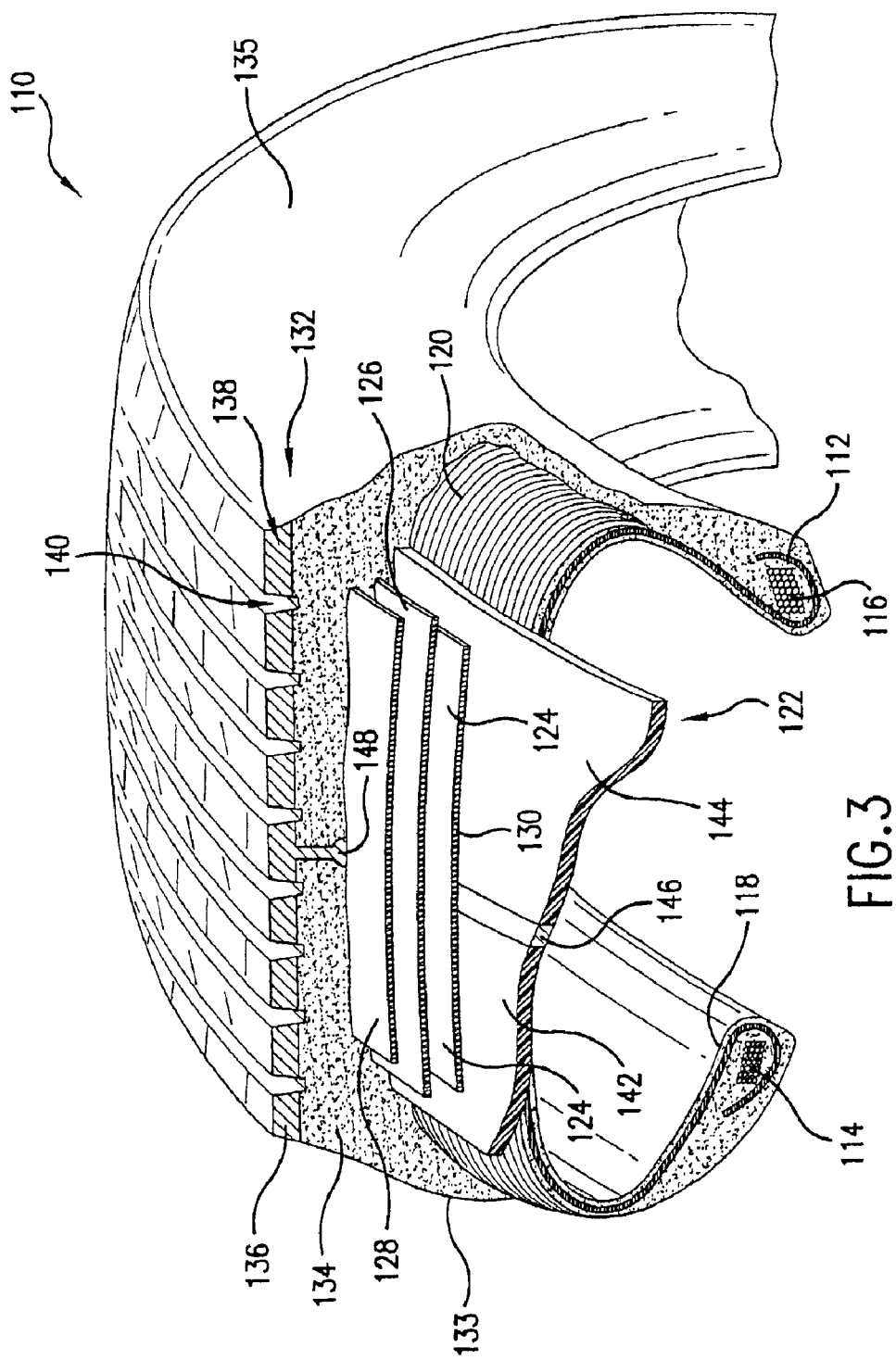
FIG. 3 is a partial cross-sectional view of an exemplary embodiment of the present invention.

FIG. 3 provides is an exemplary embodiment of a pneumatic tire 110 according to the present invention. (The use of similar reference numerals throughout this specification is used to indicate identical or substantially similar components—e.g. 24, 124, 224. and 324). Tire 110 is provided with a path that allows for dissipation of a static charge through a vehicle's wheel, through carcass 112, and to the ground in contact with tread cap rubber 136.

Belt cushion layer 122 is constructed from three sections. Outer insulating portions 142 and 144 are separated circumferentially by an inner conducting portion 146. Portions 142 and 144 are constructed from a material that is relatively nonconducting such as a silica based composition. In contrast, inner conducting portion 146 is constructed from a material that has a high relative conductivity. Accordingly, inner conducting portion 146 provides a conductivity path between carcass 12 and belt layers 124, 126, and 128. By way of example only, belt cushion layer 122 can be constructed using various methods of extrusion as will be understood by one of skill in the art using the teachings disclosed herein.

Layers 124, 126, and 128 are also electrically conducting due to the composition of layers 124, 126, and 128 including steel cords 130. As a result, layers 124, 126, and 128 provide a conductivity path that connects inner conducting portion 146 with conducting bridge 148. Extending radially inward from tread cap rubber 136, conducting bridge 148 penetrates the insulating tread base rubber 134 to provide a path of electrical conductivity to belted layer 128. Using the teachings disclosed herein, one of skill in the art will understand that tread section 132 may also be constructed using various methods of extrusion.

Therefore, tire 110 is provided with a path that allows for dissipation of a static charge by electrically connecting a vehicle's wheel to ground. Electrical charge is dissipated by a conductivity path that passes through the metal frame of the vehicle, through the metal wheel on which tire 110 is mounted, and to carcass 112. The conductivity path then extends though belt cushion layer 122 by way of inner conducting portion 146, which is in turn connected by belt layers 124, 126, and 128 to conductivity bridge 148. Accordingly, as tread cap rubber 136 contacts the road surface, a contact and electrical path to ground is provided.

Figure 4:
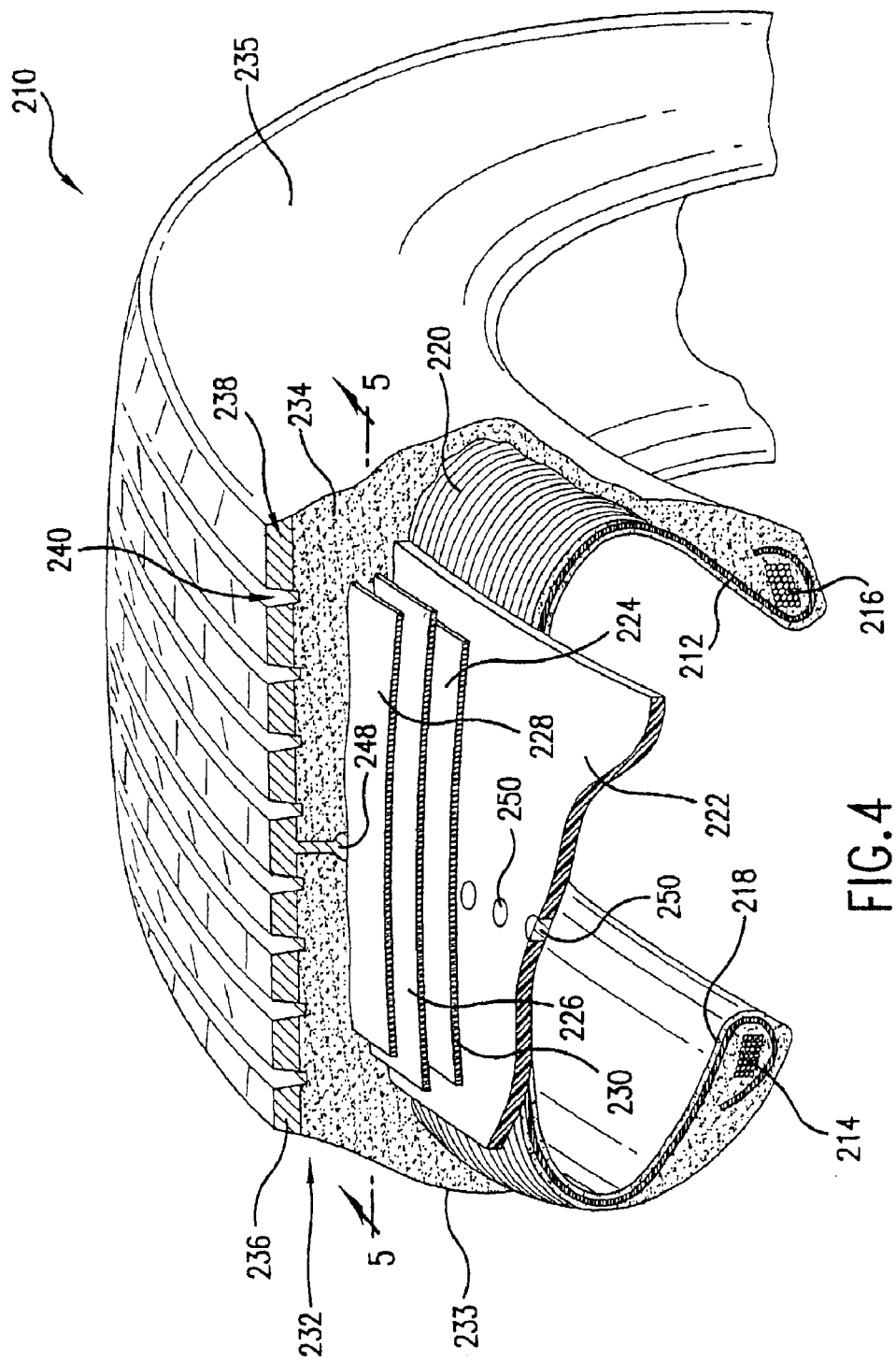
FIG. 4 is a partial cross-sectional view of an exemplary embodiment of the present invention.
Figure 5:
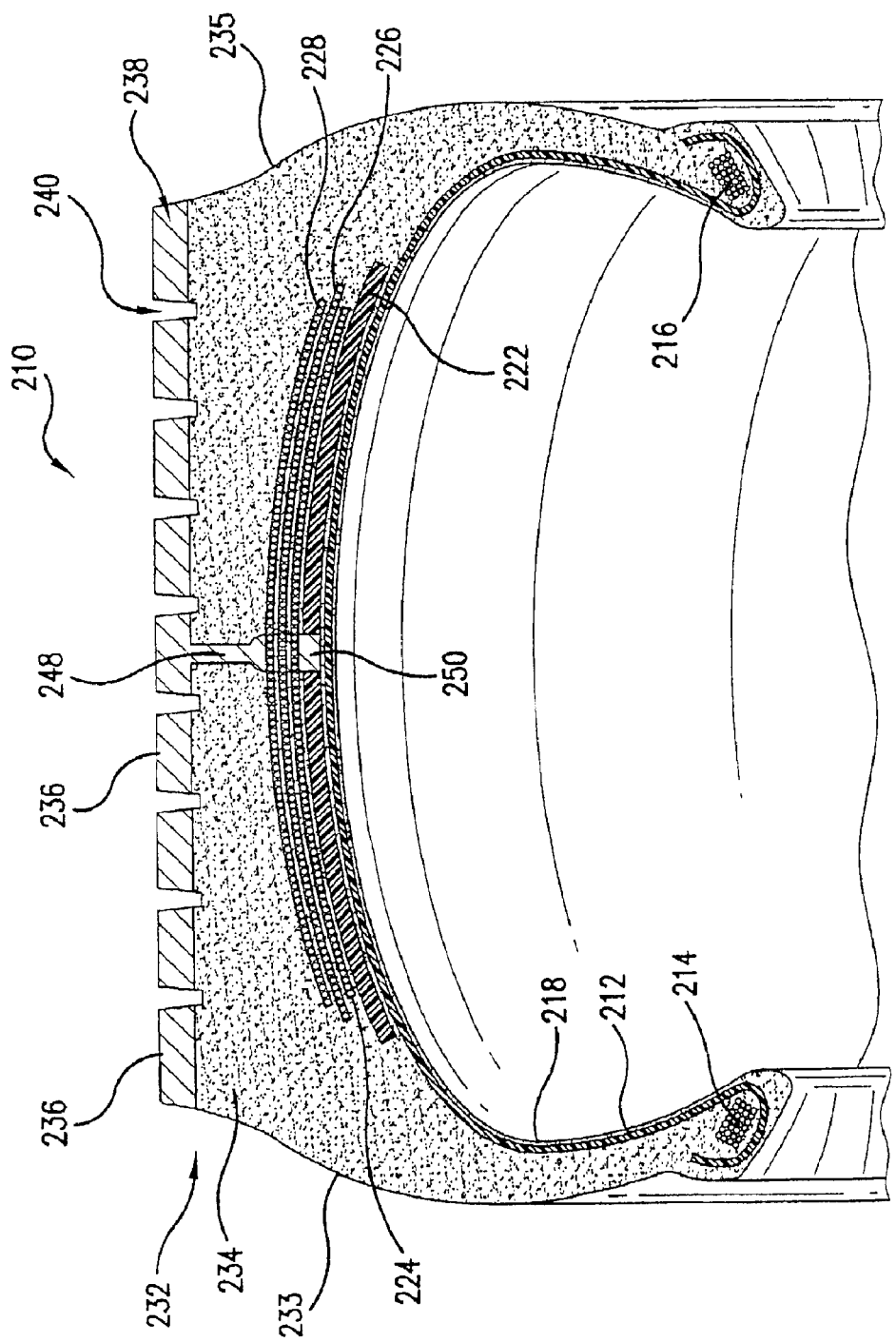
FIG. 5 is a cross-sectional view of the exemplary embodiment of FIG. 4 taken along line 5—5.

FIGS. 4 and 5 provide another exemplary embodiment of a pneumatic tire 210 according to the present invention. Tire 210 is also provided with a path that allows for dissipation of a static charge through a vehicle's wheel, through carcass 212, and to ground through tread cap rubber 236 as tire 210 contacts the ground. Belt cushion layer 222 includes a series of electrically conductive segments 250, substantially evenly spaced in a direction extending circumferentially around the tire and extending radially inward so as to provide an electrically conductive path between belted layer 224 and carcass 212. It should be understood that the present invention is not limited to evenly spaced segments 250— aligned circumferentially about the tire as shown in FIGS. 4 and 5. One of skill in the art, using the teachings disclosed herein, will understand that various orientations of segments 250 about the tire can be constructed.

By way of example only, belt cushion layer 222 may be constructed by using a pin wheel or other device to place a series of apertures along the material of construction used for belt cushion layer 222. During production, belt cushion layer 222 is placed over carcass 212 and belt layers 224, 226, and 228 are placed over belt cushion layer 222. The resulting intermediate tire is then subjected to heat and pressure causing the conductive compositions of one or both of carcass 212 and belted layer 224 to migrate into the series of evenly spaced apertures so as to form segments 250. As a result, segments 250 provide a conducting path between carcass 212 and belted layer 224. Using the teachings disclosed herein, one of skill in the art will appreciate that other methods may be used to construct segments 250.

Figure 6:
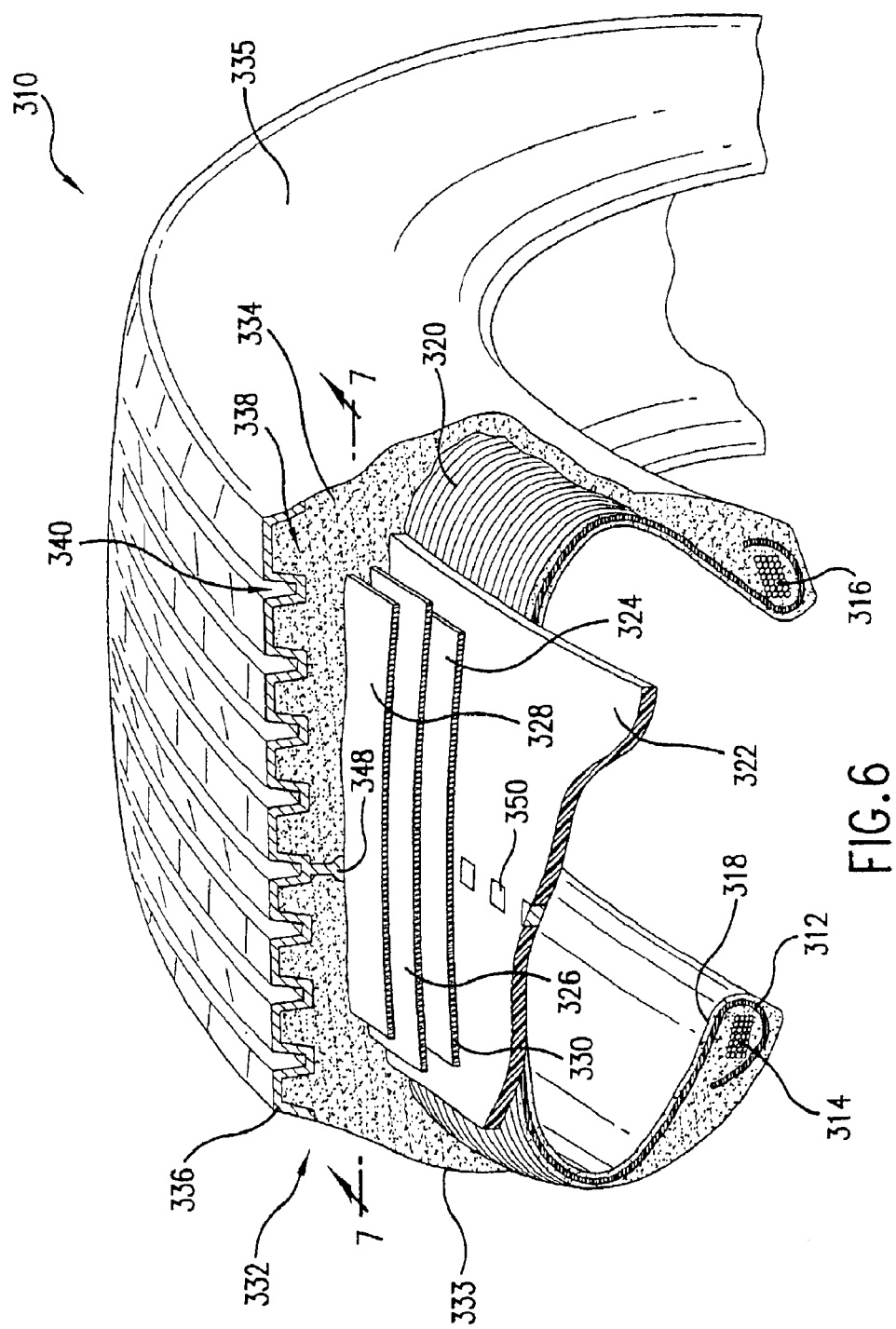
FIG. 6 is a cross-sectional view of an exemplary embodiment of the present invention.
Figure 7:
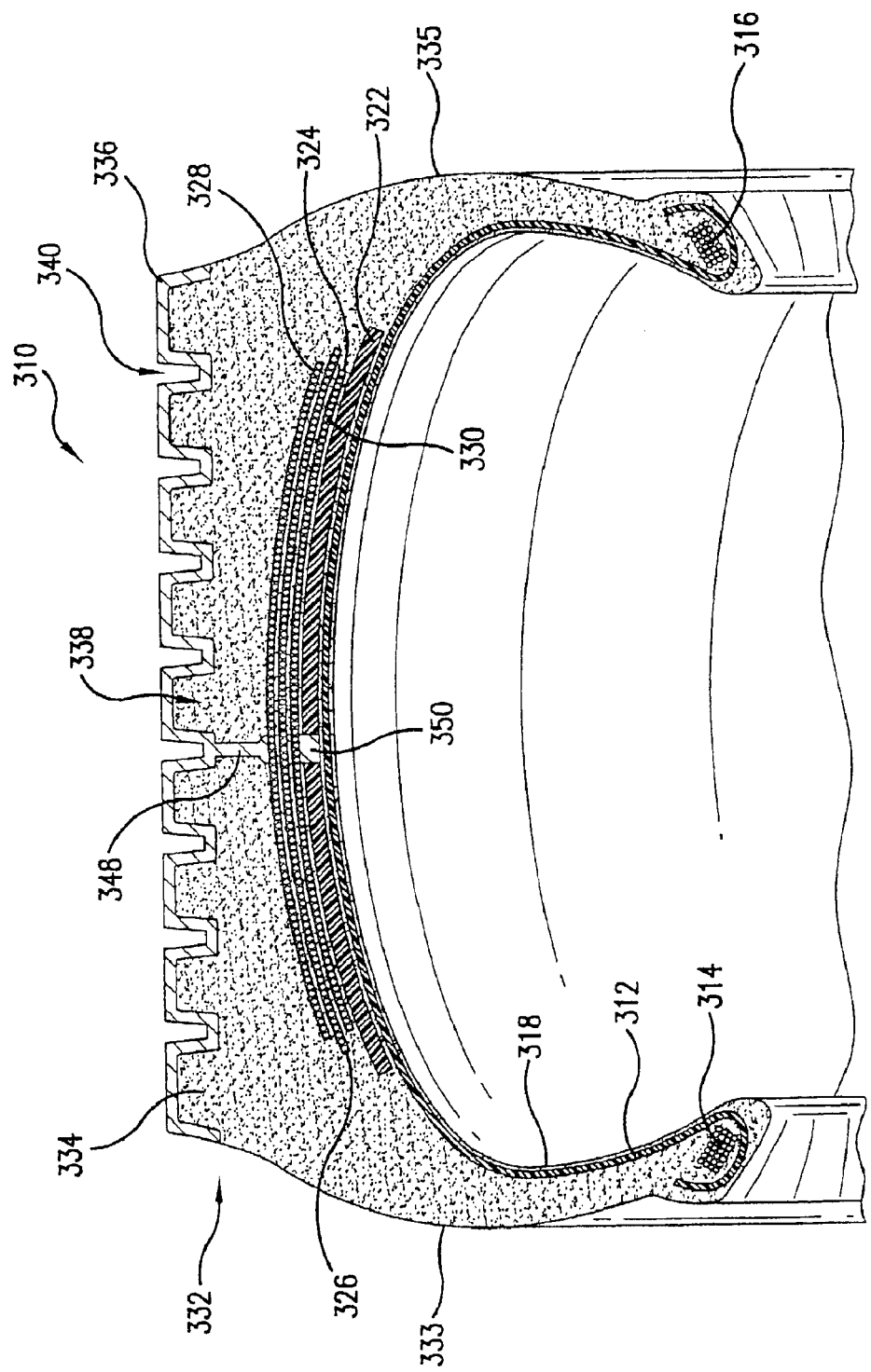
FIG. 7 is a cross-sectional view of an exemplary embodiment FIG. 6 taken along line 7—7.

For exemplary embodiment 210, conducting bridge 248 extends radially inward from tread peak 238 to belted layer 228 while segments 250 are depicted as circular in shape. However, other constructions fall within the spirit and scope of the present invention. By way of further example, FIGS. 6 and 7 illustrate another exemplary embodiment of a pneumatic tire 310 according to the present invention. Belt cushion layer 322 includes a series of electrically conductive segments 350, evenly spaced in a direction extending circumferentially around the tire and extending radially inward so as to provide an electrically conductive path between belted layer 324 and carcass 312. As shown in FIG. 6, segments 350 are square in shape as opposed to the circular segments 250 of FIG. 4. In addition, conducting bridge 248 extends radially inward from tread groove 340 rather than tread peak 338.

Reference herein has been made to insulating and conducting materials. Currently, no international standard has been established regarding what amount of resistivity or conductivity results in a tire or tire composition being referred to as insulating or conducting. However, the Employer's Association of German Rubber Industries has provided a standard, referred to as WDK Guideline 110, that may be consulted. According to this standard, tires having a discharge resistance that does not exceed $10^{10}$ ohms are deemed suitable for electrical dissipation. In tire applications that include use in an area of explosion risk, a discharge resistance that does not exceed $10^6$ ohms is suggested. If desired, materials of construction meeting these recommendations may be utilized in the construction of pneumatic tires according to the present invention.

Therefore, a pneumatic tire that provides for the dissipation of electrical charge using a tire having a conducting tread but also having certain insulating or nonconductive inner layers is provided. It should be understood that the present invention includes various modifications that can be made to the exemplary embodiments as described herein and such comes within the scope of the appended claims and their equivalents. The aforementioned description of embodiments of the present invention is by way of example only and not intended as a limitation on the spirit and scope of the claims that follow.

What is claimed is:

1. A pneumatic tire, comprising:
   a tread cap rubber defining the tread of the tire, said tread cap rubber comprised of an electrically conductive rubber material;
   a tread base rubber disposed radially inside said tread cap rubber, said tread base rubber comprised of an electrically insulating rubber;
   a pair of nonconductive sidewall portions;
   a pair of bead bundles;
   a carcass extending between said pair of bead bundles and being wrapped around each said bead bundle, said carcass being constructed from a first electrically conductive material;
   a best cushion section disposed radially outside said carcass, said belt cushion section comprised of outer insulating portions separated circumferentially by an inner conducting portion; and at least one belt layer disposed radially outside of said belt cushion section but radially inward from said tread base rubber, said at least one belt layer being constructed from a second electrically conductive material;

wherein said tread cap rubber also defines a first conducting bridge extending radially inward from said tread cap rubber, through said tread base rubber, so as to provide an electrically conductive path to said at least one belt layer and wherein said inner conducting portion is formed from said first and second electrically conductive materials from said carcass and said at least one belt layer, which connect so as to provide an electrical connection between between said carcass and said at least one belt layer.

2. A pneumatic tire as in claim 1, wherein said tread cap rubber comprises a series of tread peaks and tread grooves, and said first conducting bridge extends radially inward from said tread peak.

3. A pneumatic tire as in claim 1, where said tread cap rubber comprises a series of tread peaks and tread grooves, and said first conducting bridge extends radially inward from said tread groove.

4. A pneumatic tire as in claim 1, wherein said tread cap rubber is constructed so that the tire has a discharge resistance of about $10^{10}$ ohms or less.

5. A pneumatic tire as in claim 1, wherein said tread cap rubber is constructed so that the tire has a discharge resistance of about $10^6$ ohms or less.

6. A pneumatic tire having a tread, comprising:

a tread section comprised (i) a tread cap rubber defining the tread of the tire and being constructed from an electrically conductive rubber material and (ii) a tread base rubber located radially inside said tread cap rubber, wherein said tread cap rubber also defines a first conducting path extending through said tread base rubber;

a pair of nonconductive sidewall portions;

a pair of bead bundles;

a carcass section extending between said pair of bead bundles and being wrapped around each said bead bundle, said carcass section being constructed from a first electrically conductive material;

a belt cushion section disposed radially outside the carcass section, said belt cushion section comprised of an electrically insulating material, said belt cushion section defining a series of circumferentially spaced apertures;

at least one belt layer disposed radially outside of said belt cushion section but radially inward from said tread section, said at least one belt layer being constructed from a second electrically conductive material;

wherein said first conducting path is electrically connected to said at least one belt layer, and wherein said first and second electrically conductive materials from said carcass section and said at least one belt layer are included within said series of circumferentially spaced apertures and connect so as to provide a second conducting path between said carcass section and said at least one belt layer.

7. A pneumatic tire as in claim 6, wherein said tread section is constructed so that the tire has a discharge resistance of about $10^{10}$ ohms or less.

8. A pneumatic tire as in claim 6, claim where said tread cap rubber comprises a series of tread peaks and tread grooves and said first conducting path extends radially inward from said tread groove.

9. A method of manufacturing a pneumatic tire, comprising:

providing a carcass section of a first electrically conductive material extending between a pair of bead bundles, the carcass section wrapping around each bead bundle;

overlaying a belt cushion section of electrically insulating material onto the carcass section;

forming a series of apertures spaced circumferentially along the belt cushion section;

providing at least one belt layer of a second electrically conductive material disposed onto the belt cushion section radially outside of the belt cushion section, extruding a tread section, the tread section comprising (i) a tread cap rubber defining the tread of the tire and being constructed from an electrically conductive rubber material and (ii) a tread base rubber located radially inside the tread cap rubber, wherein the tread cap rubber also defines a first conducting path extending through the tread base rubber;

applying the tread section onto the at least one belt layer to form an intermediate tire wherein the first conducting path is electrically connected to the at least one belt layer; and subjecting the intermediate tire to heat and pressure so as to cause the first and second electrically conductive materials from the carcass section and the at least one belt layer to migrate into the series of apertures and connect so as to provide a second conducting path between the carcass section and the at least one belt layer.

10. A method of manufacturing a pneumatic tire as in claim 9, wherein the first and second electrically conductive materials are selected such that the tire has a discharge resistance of about $10^{10}$ ohms or less.

11. A method of manufacturing a pneumatic tire as in claim 9, wherein the first and second electrically conductive materials are selected such that the tire has a discharge resistance of about $10^6$ ohms or less.

* * * * *

UNITED STATES PATENT AND TRADEMARK OFFICE
CERTIFICATE OF CORRECTION

PATENT NO.        : 6,868,878 B2
APPLICATION NO. : 10/271331
DATED             : October 14, 2002
INVENTOR(S)       : Janajreh et al.

It is certified that error appears in the above-identified patent and that said Letters Patent is hereby corrected as shown below:

At Column 6, line 66, issued claim 1 recites "a best cushion section. . ." while the corresponding application claim 7 recites "a belt cushion section." Assignee requests correction of "best" to read "belt."

At Column 8, line 12, issued claim 8 recites "A pneumatic tire as in claim 6 claim where . . . " while the corresponding application claim 6 does not include the extra word "claim" between "6" and "where." Assignee requests removal of the extra word "claim".

At column 7, line 15, issued claim 1 (application claim 7) states ". . . to provide an electrical connection between said carcass and . . .." The second "between" is extraneous and a mistake of minor character due to a clerical or typographical error. Assignee requests removal of the extraneous "between."

At column 7, line 32, issued claim 6 (application claim 1) states "a tread section comprised (i) a tread cap rubber . . .." In the September 2, 2004 Amendment, the word "comprised" was not corrected to read "comprising." This, too is a minor typographical error. Assignee requests that "comprised" be corrected to read "comprising."

Signed and Sealed this

Twenty-second Day of August, 2006

JON W. DUDAS
*Director of the United States Patent and Trademark Office*

UNITED STATES PATENT AND TRADEMARK OFFICE
CERTIFICATE OF CORRECTION

PATENT NO.         : 6,868,878 B2
APPLICATION NO. : 10/271331
DATED                 : March 22, 2005
INVENTOR(S)      : Janajreh et al.

It is certified that error appears in the above-identified patent and that said Letters Patent is hereby corrected as shown below:

At Column 6, line 66, issued claim 1 recites "a best cushion section. . ." while the corresponding application claim 7 recites "a belt cushion section." Assignee requests correction of "best" to read "belt."

At Column 8, line 12, issued claim 8 recites "A pneumatic tire as in claim 6 claim where . . . " while the corresponding application claim 6 does not include the extra word "claim" between "6" and "where." Assignee requests removal of the extra word "claim".

At column 7, line 15, issued claim 1 (application claim 7) states ". . . to provide an electrical connection between said carcass and . . .." The second "between" is extraneous and a mistake of minor character due to a clerical or typographical error. Assignee requests removal of the extraneous "between."

At column 7, line 32, issued claim 6 (application claim 1) states "a tread section comprised (i) a tread cap rubber . . .." In the September 2, 2004 Amendment, the word "comprised" was not corrected to read "comprising." This, too is a minor typographical error. Assignee requests that "comprised" be corrected to read "comprising."

This certificate supersedes Certificate of Correction issued August 22, 2006.

Signed and Sealed this

Tenth Day of October, 2006

JON W. DUDAS
*Director of the United States Patent and Trademark Office*